United States Patent [19]
Roth

[11] Patent Number: 6,096,288
[45] Date of Patent: Aug. 1, 2000

[54] SYNTHESIS OF THE CUBIC MESOPOROUS MOLECULAR SIEVE MCM-48

[75] Inventor: Wieslaw J. Roth, Sewell, N.J.

[73] Assignee: Mobil Oil Corporation, Fairfax, Va.

[21] Appl. No.: 09/169,801

[22] Filed: Oct. 12, 1998

[51] Int. Cl.[7] .......................... C01B 33/113; C01B 33/20
[52] U.S. Cl. ...................... 423/702; 423/705; 423/328.2; 423/335
[58] Field of Search .................................. 423/702, 705, 423/713, 328.2, 335

[56] References Cited

U.S. PATENT DOCUMENTS

| | | | |
|---|---|---|---|
| 5,102,643 | 4/1992 | Kresge et al. | 423/328 |
| 5,108,725 | 4/1992 | Beck et al. | 423/263 |
| 5,198,203 | 3/1993 | Kressge et al. | 423/718 |
| 5,238,676 | 8/1993 | Roth et al. | 423/713 |
| 5,250,282 | 10/1993 | Kresge et al. | 423/705 |
| 5,300,277 | 4/1994 | Kresge et al. | 423/703 |
| 5,334,368 | 8/1994 | Belk et al. . | |
| 5,593,655 | 1/1997 | Jongkind et al. | 423/702 |

OTHER PUBLICATIONS

A. Corma et al., "Synthesis of SI and Ti–Si–MCM–48 mesoporous materials with controlled pore sizes in the absence of polar organic additives and alkali metal ions", Chemical Communication, 1998, 579–580, (No Month).

Q. Huo, et al., "Surfactant Control of Phases in the Synthesis of Mesoporous Silica–Based Materials", *Chemistry of Materials,* vol. 8, No. 5, 1996, 1147–1160, (No Month).

K. Gallis et al. "Synthesis of MCM–48 By a Phase Transformation Process", *Chemistry of Materials,* col. 9, 1997, 2035–2038, (No Month).

*Primary Examiner*—Mark L. Bell
*Assistant Examiner*—David Sample

[57] ABSTRACT

A method for synthesizing MCM-48 includes combining an inorganic silica reagent, an alkylammonium hydroxide and halide-containing surfactant to form a reaction mixture which is maintained under sufficient conditions to form a crystalline MCM-48 product. In a preferred embodiment, the organic silica reagent and the alkylammonium hydroxide are combined in the agueous medium to form a first reactions mixture and the halide-containing surfactant is then added to the first mixture so as to form a second reaction mixture which is then reacted to form the MCM-48 product. The crystalline MCM-48 material according to the invention can be functionalized by adding aluminum. The crystalline MCM-48 product produced by the process of this invention possesses an X-ray diffraction pattern indicative of a cubic unit cell with Ia3d symmetry.

18 Claims, 2 Drawing Sheets

FIG. 1
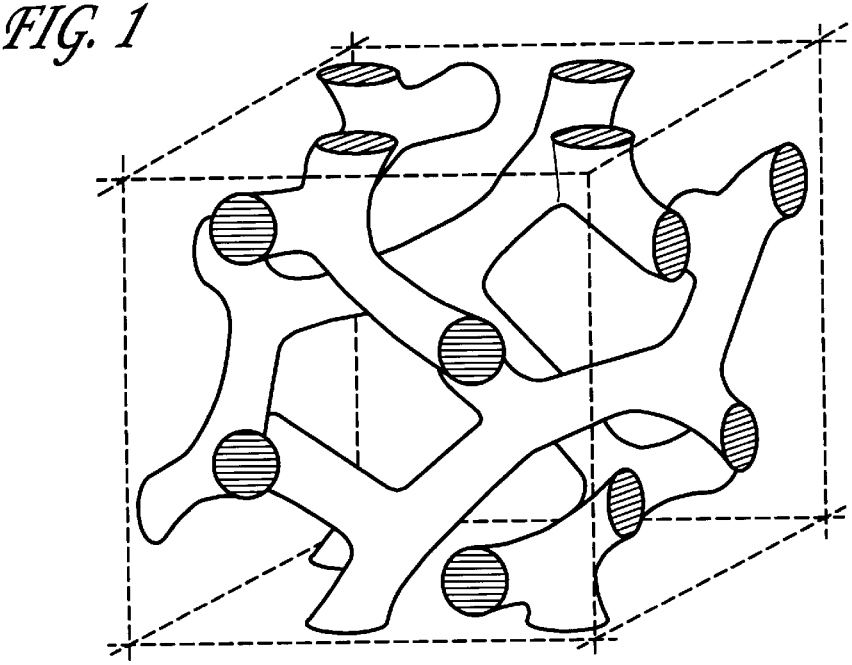
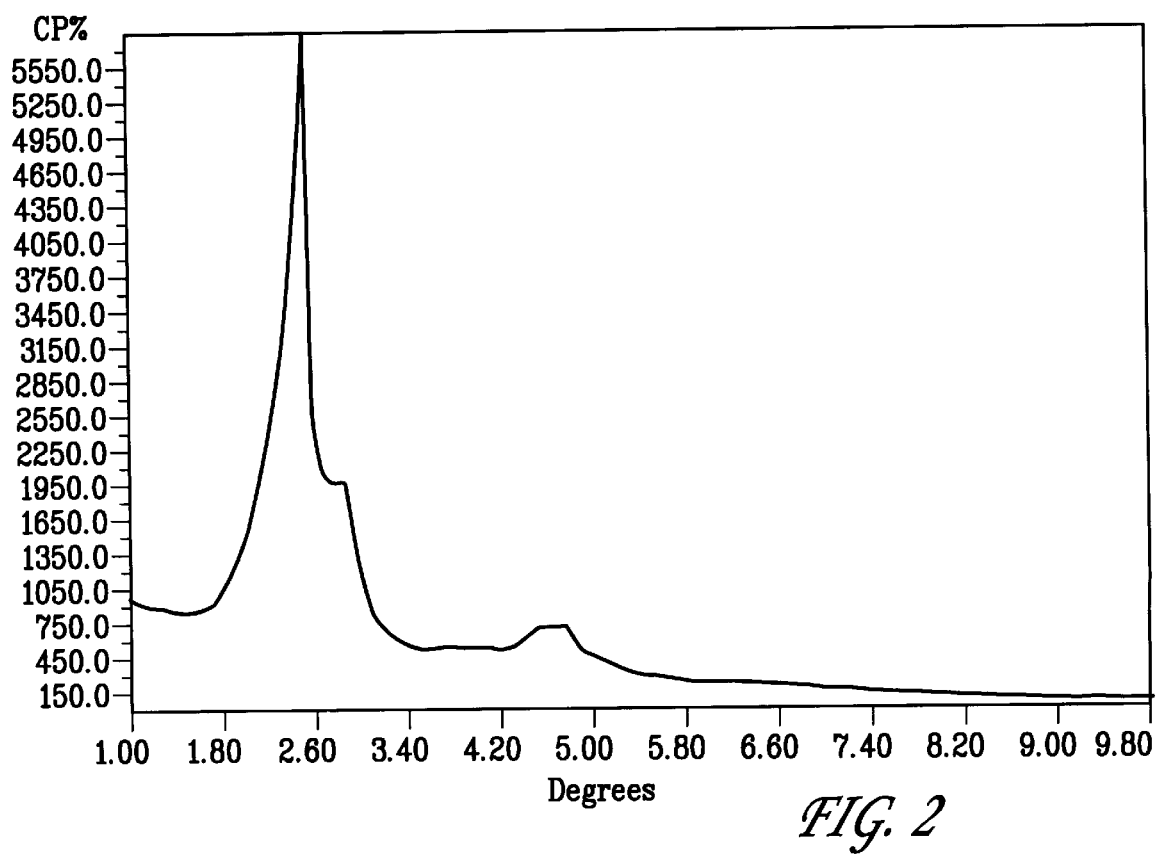
FIG. 2

SYNTHESIS OF THE CUBIC MESOPOROUS MOLECULAR SIEVE MCM-48

BACKGROUND OF THE INVENTION

A. Field of the Invention

This invention relates to methods for synthesizing MCM-48. The processes of the invention include reacting an inorganic silica reagent, an alkylammonium hydroxide, and a halide-containing surfactant in an aqueous medium. The process can be carried out in a single step or in multiple steps such that the inorganic silica reagent and the alkylammonium hydroxide are reacted first to form a first reaction mixture. This first reaction mixture then is combined with a halide-containing surfactant to form a second reaction mixture that is maintained under sufficient conditions to form a crystalline MCM-48 product. Preferably, the MCM-48 synthesis according to this invention is accomplished using the same convenient reagents and processing as for MCM-41, i.e., in an aqueous medium that is alcohol free, using readily available commercial reactants that are relatively safe and easy to handle.

B. Description of the Prior Art

MCM-48 is a crystalline, high silica-containing molecular sieve material and is described, for example, in U.S. Pat. No. 5,198,203, which is hereby incorporated by reference. It is a member of a family of mesoporous materials known by the designation "M41 S." In addition to MCM-48, other members of the M41S family of materials include MCM-41 and MCM-50.

MCM-48 differs from MCM-41 and MCM-50 in its crystal and pore structures. MCM-41 has a hexagonal crystal structure with a uni-dimensional pore system, while MCM-50 has a lamellar structure. MCM-48, on the other hand, has a cubic Ia3d symmetrical structure, with a proposed three-dimensional pore system, like that shown schematically in FIG. 1, having two independent intertwined channel networks. Because of this three-dimensional pore structure, MCM-48 is an attractive candidate for use in various sorption and catalysis applications (e.g., this three-dimensional pore structure provides high surface area for adsorption and contacting reactants).

While attractive because of its possible three-dimensional pore structure, crystalline MCM-48 has not been widely used. Difficulties in synthesizing MCM-48, in the laboratory and particularly on a large scale commercial basis, have limited the availability of this material. While various methods for synthesizing MCM-48 are known, each has significant drawbacks. For example, much of the MCM-48 produced by known methods has been produced using alkoxide-based organic silica sources, such as tetraethylorthosilicate ($Si(OC_2H_5)_4$ or "TEOS") or its homologues. See, for example, Q. Huo et al., "Surfactant Control of Phases in the Synthesis of Mesoporous Silica-Based Materials," *Chemistry of Materials*, Vol. 8 (1996), pp. 1147–1160. These reagents, however, present significant handling problems (e.g., high toxicity, moisture sensitivity) and are quite costly, making large-scale synthesis of crystalline MCM-48 by this procedure impractical.

Another known procedure for making MCM-48 uses conventional silica sources, but this procedure also requires addition of alcohol during the synthesis. See, for example, U.S. Pat. No. 5,300,277. The MCM-48 product produced by the procedure described in this patent had lower quality (as determined by X-ray diffraction) than that prepared from TEOS. Additionally, this synthesis process generated high pressures when the temperature was elevated during the synthesis.

Corma et al., "Synthesis of Si and Ti—Si—MCM-48 Mesoporous Materials with Controlled Pore Sizes in the Absence of Polar Organic Additives and Alkali Metal Ions," *Journal of the Chemical Society, Chemical Communications*, (1998), pp. 579–580, describe an alcohol-free MCM-48 synthesis. The surfactant solution used in this synthesis process is an aqueous solution of cetyltrimethylammonium hydroxide/bromide ($C_{16}$TMAOH/Br) with an OH/Br ratio of 90/10 (i.e., 90% $C_{16}$TMAOH and 10% $C_{16}$TMABr). This hydroxide-based surfactant material, however, is difficult to obtain and relatively expensive. The typical method of obtaining such hydroxide-based surfactants is by substitution of the halide ion in a halide-based surfactant, e.g., by ion exchange with hydroxide. This approach to generating a $C_{16}$TMAOH/halide (Cl) mixture was disclosed in U.S. Pat. No. 5,102,643 in the context of the M41S family in general. Thus, the MCM-48 synthesis described by Corma is likely preceded by a substitution step (OH for Br), which could be avoided if the commercially available halide-containing surfactant solution could be used directly, as in the present case.

Thus, advancement and testing of crystalline MCM-48 products have been hampered by the unavailability of this material due to the difficult, expensive, elusive, and not consistently reproducible synthesis procedures required to produce it. There is a need in the art for a convenient method for synthesizing high silica MCM-48. Preferably, this method would use the same simple combination of reagents than can be used to produce the other members of the M41S family, i.e., aqueous, alcohol-free media and reagents that are commercially available and relatively easy to handle, e.g., precipitated silica, surfactant chloride, and tetramethylammonium hydroxide. Additionally, this method preferably will be capable of large-scale production of MCM-48 in a commercially viable manner.

SUMMARY OF THE INVENTION

This invention seeks to overcome deficiencies in known procedures for making crystalline MCM-48. In a first aspect, this invention relates to methods for synthesizing crystalline MCM-48. The methods according to the invention include reacting an inorganic silica reagent, an alkylammonium hydroxide, and a halide-containing surfactant in an aqueous medium. This method can be carried out in a single step or by multiple steps such that the inorganic silica reagent and the alkylammonium hydroxide are reacted first, in an aqueous medium, to form a first reaction mixture. This first reaction mixture is combined with a halide-containing surfactant to form a second reaction mixture, which is maintained under sufficient conditions to form a crystalline MCM-48 product. Preferably, the first and second reaction mixtures include aqueous media that are alcohol free. Advantageously, the methods according to the invention can be performed using readily available, commercial reactants that are relatively safe and easy to handle, such as precipitated silica, tetramethylammonium hydroxide, and hexadecyltrimethylammonium halide.

The method according to the invention can also include the step of functionalizing the crystalline MCM-48 product with an appropriate functionalizing element or compound. For example, MCM-48 can be functionalized by adding aluminum, alumina, or another aluminum containing compound to the MCM-48 crystal, e.g., by slurrying crystalline MCM-48 with aluminum nitrate nonahydrate in an alcohol solvent and recovering the aluminum functionalized MCM-48 product.

The invention also relates to crystalline MCM-48 products produced by the methods according to the invention.

These products have an X-ray diffraction pattern indicative of a cubic unit cell with Ia3d symmetry, like that shown schematically in FIG. 1.

BRIEF DESCRIPTION OF THE DRAWINGS

The advantageous features of this invention will become more evident when considered in conjunction with the following detailed description and the attached figures, wherein:

FIG. 1 schematically illustrates the accepted model of the channel structure of MCM-48 materials produced according to the invention;

FIG. 2 illustrates the X-ray diffraction pattern for the MCM-48 material produced in Example I.

DETAILED DESCRIPTION OF THE INVENTION

Figure 3:
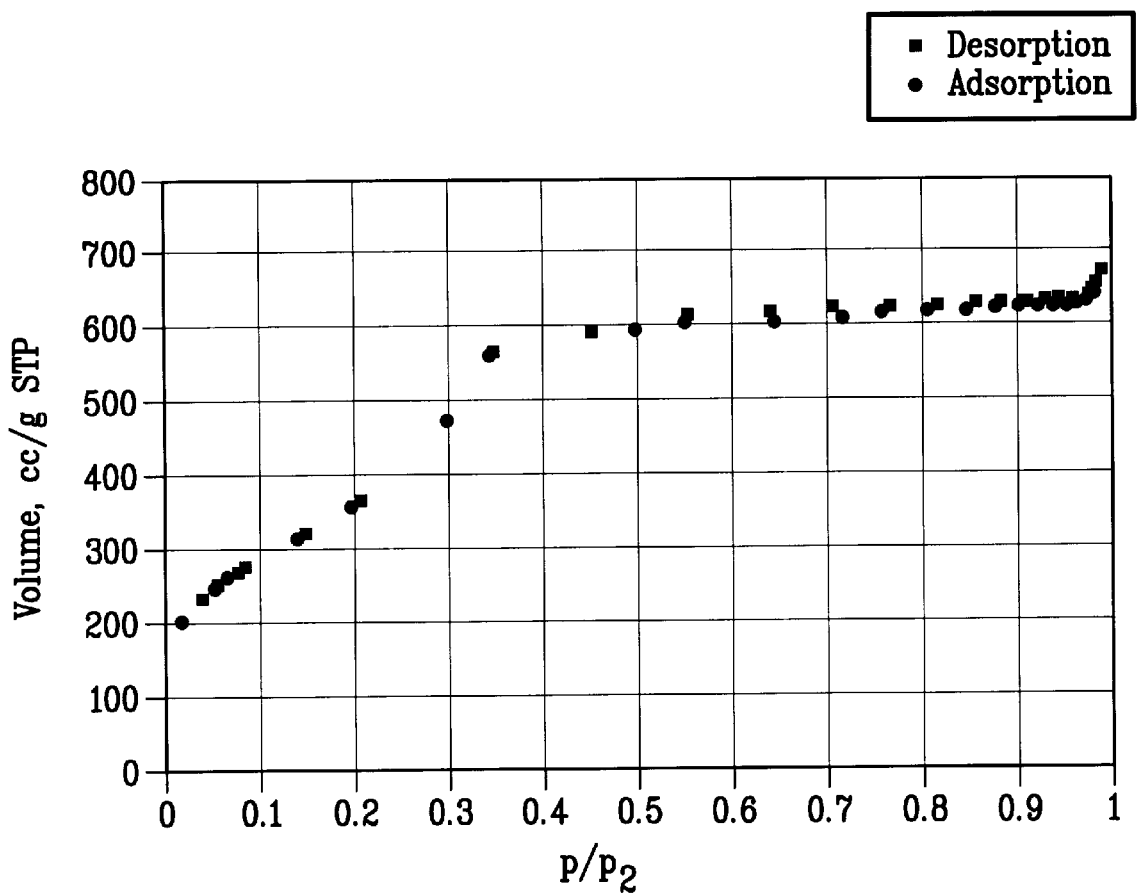
FIG. 3 illustrates the nitrogen isotherm data for the MCM-48 material produced in Example I.

This invention provides improved methods for synthesizing MCM-48, a cubic member of the M41S family having a three-dimensional porous structure. The methods include reacting an inorganic silica reagent, an alkylammonium hydroxide, and a halide-containing surfactant in an aqueous medium. This method can be carried out in a single step or by multiple steps such that the inorganic silica reagent and the alkylammonium hydroxide are reacted first, in an aqueous medium, to form a first reaction mixture. After digesting/reacting, this first reaction mixture is combined with a halide-containing surfactant to form a second reaction mixture. This second reaction mixture is maintained under sufficient conditions to form a crystalline MCM-48 product, which is then recovered and optionally further treated, e.g., by washing, drying, calcining, etc.

Any suitable inorganic silica reagent can be used in this process without departing from the invention. Precipitated silicas, such as ULTRASIL® (commercially available from Degussa) can be used, as can other silica reagents such as HISIL (PPG Corp.), LUDOX (duPont) and other reagents having a low content (e.g., less than 1%) of metal cations. Similarly, any suitable alkylammonium hydroxide reagent can be used in the process of the invention. In one preferred embodiment of the invention, tetramethylammonium hydroxide is used. Other suitable examples of alkylammonium hydroxide reagents include tetraethylammonium and tetrapropylammonium hydroxides.

The first step in the multiple-step process according to the invention includes a reaction between the inorganic silica reagent and the alkylammonium hydroxide reagent in an aqueous medium. Preferably, this reaction takes place at a temperature ranging from about room temperature to about 200° C., and more preferably from about 50° C. to about 100° C., for a time period ranging from about 1 minute to about 24 hours, and more preferably from about 15 minutes to about 2 hours.

The first step of the inventive process involves partial digestion of silica to facilitate reaction between silicate ions in solution and the surfactant, which is added in the second reaction step. All reagents and additives, except the aqueous surfactant solution, are preferably, but not necessarily, added in this first step.

In the course of carrying out the one-step reaction, or after completing the first reaction step of the multiple step reaction, the reaction product of the inorganic silica reagent and the alkylammonium hydroxide is combined with a halide-containing surfactant to form a second reaction mixture. The halide-containing surfactant predominantly contains halide anions as opposed to hydroxide or other anions. Preferably 75% of the anions in the surfactant are halides, and more preferably greater than 85% are halides, up to 100% halides. Examples of useful surfactants include, but are not limited to, hexadecyltrimethylammonium chloride and hexadecyltrimethylammonium bromide. Homologous surfactants with different side chain lengths, e.g., from 8 to 22 carbon atoms, are expected to work in the same manner, albeit at somewhat different reactant ratios. Like the first reaction mixture, this second reaction mixture also comprises an aqueous solution.

To produce the crystal MCM-48 product, the second reaction mixture is maintained under suitable crystallization conditions. These conditions may include, for example, maintaining the second reaction mixture at a temperature ranging from about 50° C. to about 200° C., and more preferably from about 95° C. to about 180° C., for a time period ranging from about 5 minutes to about 48 hours, and more preferably from about 30 minutes to about 12 hours. The solid MCM-48 crystals formed during this procedure can be recovered in any suitable manner, such as by filtration, decanting, etc.

During this crystallization step, reaction time and temperature should be carefully controlled to assure formation of crystal MCM-48. The presence of crystals of cubic MCM-48 can be determined by its characteristic X-ray diffraction pattern, which is described in more detail in the examples that follow (see also FIG. 2).

The relative amounts of the various reactants present during the method according to the invention also can have an effect on the product produced. For example, the relative amounts of silicon (Si) and surfactant should be controlled to optimize production of the cubic MCM-48 product. Preferably, these ingredients are added to the reaction mixtures such that a Si/Surfactant molar ratio of about 2:1 to about 5:1 is present in the second reaction mixture, more preferably from about 2.5:1 to about 4:1, and most preferably about 3:1.

Additionally, the relative amounts of hydroxide (OH) and surfactant also can have an impact on cubic MCM-48 production. Preferably, these ingredients are added to the reaction mixtures such that an OH/Surfactant molar ratio of about 1.2:1 to about 0.7:1 is present in the second reaction mixture, more preferably from about 1.1:1 to about 0.8:1, and most preferably from about 1:1 to about 0.9:1. Those skilled in the art will be capable of determining optimum relative amounts of these various reactants using routine experimentation.

As noted above, one object of this invention is to provide a simple, commercially viable process for making cubic MCM-48 that uses aqueous reaction media. Preferably, these aqueous media are alcohol free.

The cubic MCM-48 material produced by the process of this invention can be used for any suitable adsorption or catalytic application, such as disclosed in the prior art. Additionally, the MCM-48 can be treated with other agents or materials to enhance its catalytic or sorption performance or properties by procedures that are common and known to those skilled in this art. For example, MCM-48 can be functionalized with aluminum, alumina, or another aluminum-containing compound to improve its acid activity. One specific way of functionalizing MCM-48 includes slurrying the as-synthesized crystalline MCM-48 product with an appropriate aluminum-containing reagent, such as aluminum nitrate nonahydrate, in an appropriate solvent, such as an alcohol solvent, or other organic liquid that facilitates surfactant extractability. After a suitable reaction time (e.g., for about 0.5 to about 12 hours at a temperature in the range of about 25° C. to about 95° C.), an aluminum functionalized MCM-48 product can be recovered from the reaction mixture, e.g., by filtration, etc.

Any other suitable functionalizing reagents can be used without departing from the invention. Examples include titanium, zirconium, iron, vanadium, other transition metals, their combinations with anions such as sulfate and phosphate, lanthanides, anchored organic and inorganic functional groups such as thiols and other sulfur-containing species, and acid groups.

The invention now will be described in terms of various specific examples and preferred embodiments. These examples and embodiments should be construed as illustrating the invention, and not as limiting it.

EXAMPLE I

Preparation of Siliceous MCM-48

31 grams of precipitated silica (ULTRASIL®, available from Degussa) and 57 grams of a 25 wt. % solution of tetramethylammonium hydroxide ("TMA-OH") were added to 165 grams of water. This mixture was digested at 100° C. for 1 hour. Thereafter, a 29 wt. % solution of the surfactant hexadecyltrimethylammonium chloride (172.5 grams) was added to the above reaction mixture. The ensuing mixture was reacted for 12 hours at 150° C., resulting in formation of a solid product.

The solid product was separated from the mixture by filtration, washed, and dried at about 120° C. The product then was analyzed by X-ray diffraction on a Scintag diffractometer equipped with conventional software. This analysis indicated a cubic unit cell geometry with Ia3d symmetry having a =92.5 Å, confirming production of crystalline MCM-48. The following X-ray diffraction data was collected:

TABLE 1

| X-Ray Diffraction Data - Pre-Calcination* | | |
|---|---|---|
| hk1 | Observed 2-theta (°) | Calculated 2-theta (°) |
| 211 | 2.25 | 2.247 |
| 220 | 2.59 | 2.609 |
| 321 | 3.47 | 3.480 |
| 400 | 3.74 | 3.725 |
| 420 | 4.20 | 4.176 |
| 332 | 4.41 | 4.384 |
| 422 | 4.59 | 4.584 |
| 431 | 4.73 | 4.776 |

*Calculated by peak deconvolution and least squares refinement. Analysis in weight %: Ash - 47.2%; C - 35.2%; N - 2.284%

10 grams of the as-synthesized MCM-48 product was then calcined at 540° C. for 4 hours in air. X-ray diffraction was performed after this additional treatment, and the results are shown in FIG. 2. As shown, X-ray diffraction resulted in the following peaks, indexed based on an Ia3d cell with a =84.63 Å:

TABLE 2

| X-Ray Diffraction Data - Post-Calcination* | | |
|---|---|---|
| hk1 | Observed 2-theta (°) | Calculated 2-theta (°) |
| 211 | 2.41 | 2.399 |
| 220 | 2.78 | 2.795 |
| 321 | 3.75 | 3.746 |
| 400 | 4.02 | 4.016 |
| 420 | 4.49 | 4.510 |
| 332 | 4.73 | 4.737 |
| 422 | 4.99 | 4.953 |
| 431 | 5.15 | 5.164 |

*Calculated by peak deconvolution and least squares refinement.

It also was determined that the resulting MCM-48 product had the following adsorption characteristics: (a) an $N_2$ isotherm at 77 K with capillary condensation, essentially without hysteresis, at $p/p_o$=about 0.25 to 0.30 (see FIG. 3) and an adsorption capacity of approximately 600 cc/g at standard temperature and pressure; (b) an adsorption capacity for water of 32.6 wt. %; and (c) an adsorption capacity for cyclohexane of greater than 50 wt. %. When tested for hexane cracking activity in a standardized alpha test, it was found that this product provided 1.7% conversion.

Example II

Functionalizing MCM-48 with Aluminum 20 grams of the MCM-48 compound from Example 1, prior to calcination, was slurried in a solution of 40 grams of aluminum nitrate nonahydrate in 300 ml ethanol at 60° C. for 3 hours. The solid product was recovered by filtration, washed in alcohol, and dried. Product analysis provided the following data:

Ash—54.9 wt %; Alumina—7.057 wt %; C—6.87 wt %; N—2.48 wt %

This data demonstrates that alumina was inserted into the high silica MCM-48 material with a concomitant extraction of surfactant.

After calcination at 540° C. for 4 hours, the solid showed reduced nitrogen adsorption capacity of 220 cc/g (at standard temperature and pressure conditions) and increased hexane conversion of 4.4% (alpha=3).

EXAMPLE III

Effect of Crystallization Time on MCM-48 Synthesis

This synthesis mixture was prepared in a manner similar to that used in Example I. 285 grams of a 25 wt. % solution of TMA-OH were added to 825 grams of water and 155 grams of ULTRASIL® precipitated silica. This mixture was digested at 100° C. for 1 hour. Thereafter, a 29 wt. % solution of the surfactant $C_{16}$TMA-Cl (862.5 grams) was added to the above reaction mixture and homogenized. This new mixture was separated into five different 600 cc autoclaves and reacted at 150° C. for various time periods as follows: (a) 6 hours; (b) 10 hours; (c) 12 hours; (d) 16 hours; and (e) 20 hours.

The solid products were separated from their respective reaction mixtures by filtration, washed, and dried at about 120° C. These products then were analyzed by X-ray diffraction on a Scintag diffractometer equipped with conventional software. The products obtained via the 6 and 10 hour crystallization procedures exhibited, after calcination, the X-ray diffraction pattern of crystalline MCM-48, i.e., a cubic unit cell geometry with Ia3d symmetry. These products were judged to contain impurities based on the X-ray diffraction pattern of the as-synthesized product and on the characteristics of the nitrogen adsorption/desorption isotherm. Specifically, the 6 hour product contained some amorphous solid, while the 10 hour product included some lamellar silicate phases. These results suggest that, under the conditions employed, the optimal crystallization time for MCM-48 production was likely between 6 and 10 hours.

EXAMPLE IV

Increased Scale Preparation of MCM-48

Based on results described in Example III, an increased scale preparation of MCM-48 was carried out. 200 grams of a 25% TMA-OH solution, 582 grams of water, and 110 grams of ULTRASIL® were reacted at 100° C. for 1 hour. After addition of 608 grams of a 29% $C_{16}$TMA-Cl solution, the reaction was continued for 8 hours at 150° C. The product was isolated as above. As shown in Table 3, the X-ray diffraction patterns were characteristic of MCM-48 and showed the high quality of the product.

TABLE 3

X-Ray Diffraction Data for the Products of Example IV

| hkl | 2-theta experimental | 2-theta calculated |
|---|---|---|
| As-Synthesized Product, Unit Cell a = 95.96(8) Å | | |
| 211 | 2.27 | 2.26 |
| 220 | 2.6 | 2.6 |
| 321 | 3.46 | 3.44 |
| 400 | 3.68 | 3.68 |
| 420 | 4.12 | 4.12 |
| 332 | 4.31 | 4.32 |
| 422 | 4.59 | 4.51 |
| 431 | 4.69 | 4.7 |
| Calcined Product, Unit Cell a = 87.1(1) Å | | |
| 211 | 2.49 | 2.48 |
| 220 | 2.87 | 2.87 |
| 321 | 3.79 | 3.8 |
| 400 | 4.05 | 4.06 |
| 420 | 4.56 | 4.54 |
| 332 | 4.78 | 4.76 |
| 422 | 4.97 | 4.97 |
| 431 | 5.18 | 5.15 |

Specifically, there were 11 clearly discernible peaks with d-spacing of the 1st line at 38.8 and 35.5 Å for as-synthesized and calcined materials, respectively. The nitrogen isotherm was typical of high quality MCM-48, the BET was equal to 1200 m²/g and the calculated pore size was 31 Å.

EXAMPLE V

One Step MCM-48 Preparation

Example IV was repeated but without predigestion, i.e., all reagents were combined in one step. After eight hours of reacting at 150° C., the product was predominantly an MCM-48 material, but with an impurity phase, which disappeared after additional heating for two hours.

EXAMPLE VI

Additional Synthesis Examples

Various M41S-based materials were synthesized from precipitated silica, surfactant chloride ($C_{16}$TMA-Cl), and TMA-OH, using the general reaction procedures described in Example 1 above, but using various different reaction conditions and relative Table 4, along with the characteristics of the various products obtained.

TABLE 4

M41S Synthesis Conditions and Product Properties

| | Sample 1 | Sample 2 | Sample 3 | Sample 4 |
|---|---|---|---|---|
| Synthesis Mixture - Si/Surfactant (Molar Ratio) | 3.0 | 3.5 | 4.0 | 5.0 |
| Synthesis Mixture - OH/Si (Molar Ratio) | 0.33 | 0.29 | 0.25 | 0.20 |
| Synthesis Mixture - Wt. % Surfactant | 10.5 | 9.8 | 9.6 | 9.4 |
| Synthesis Mixture - Wt. % Solid | 7.0 | 7.0 | 8.0 | 10.0 |
| Synthesis Temperature (° C.) | 150 | 150 | 150 | 150 |
| Synthesis Time (hrs.) | 12 | 24 | 24 | 24 |
| Product Type | MCM-48 | MCM-48 plus lamellar | MCM-41 plus MCM-48 | MCM-41 |
| d-spacing (Å) - as synthesized | 38 | 39, 34 | 46 | 45 |
| d-spacing (Å) - after calcination | 36 | 37 | 42 | 43 |
| Water adsorption (g/100 g) | 33 | | 10 | 7 |
| Cyclohexane adsorption (g/100 g) | >50 | 47 | >50 | >50 |
| Nitrogen adsorption (STP cc/g) | 600 | 600 | 610 | 590 |
| Nitrogen adsorption - p/$p_o$ | 0.3 | No | 0.35 | 0.42 |
| BET (m²/g) | 1320 | 931 | 1130 | 1040 |
| Product Composition - Ash wt. % | 47.2 | 41.1 | 39.4 | 43.3 |
| Product Composition - Nitrogen wt. % | 2.28 | 2.29 | 2.03 | 1.91 |
| Product Composition - Carbon wt. % | 35.2 | 38.7 | 32.8 | 30.3 |
| Product - Si/N Molar Ratio | 4.8 | 4.2 | 4.5 | 5.3 |
| Product - C/N Molar Ratio | 18.0 | 19.8 | 18.9 | 18.6 |
| Product - Si/R Molar Ratio | 5.1 | 4.0 | 4.6 | 5.4 |

As one can see from Table 3, at high Si/Surfactant molar ratios (e.g., 5) hexagonal MCM-41 was the apparent sole product. Lowering the Si/Surfactant molar ratio (e.g., about 4) resulted in mixtures of M41S species, not all of which could be identified with certainty. The product obtained at a Si/Surfactant molar ratio of about 3, under these reaction conditions, exhibited the characteristic X-ray diffraction pattern for cubic MCM-48 (see FIG. 2).

These data further demonstrates that under the synthesis conditions employed (including a synthesis temperature of 150° C.), cubic MCM-48 is a transient intermediate species. It is transformed (i.e., recrystallized) into a lamellar product if heating is continued.

The X-ray diffraction peak positions for cubic MCM-48 produced above (Sample 1, at a Si/Surfactant ratio of 3.0), both before and after calcination are provided in Tables 1 and 2, respectively.

This X-ray diffraction data corresponds to the data published for known MCM-48 samples (prepared using TEOS), thereby unequivocally establishing the production of cubic MCM-48 by the process of the invention. In the present case, there is an approximate 7 Å contraction of the Ia3d unit cell upon calcination. Additionally, the nitrogen adsorption/ desorption isotherm of the produced MCM-48 material is typical of that for M41S materials. It was found to be reversible with no or essentially no hysteresis, with high adsorption capacity and capillary condensation. The pore diameter of the MCM-48 material produced according to the invention was found to be about 30 Å (based upon the inflection point at approximately 0.3 $p/p_o$ of the nitrogen adsorption v. $p/p_o$ curve). Compared to hexagonal MCM-41 obtained with the same surfactant and under similar conditions at higher Si/Surfactant ratio, the MCM-48 material according to the invention has a pore size about 10 Å smaller, an outcome expected based on the characteristics of the M41S family.

Accordingly, this invention demonstrates that cubic MCM-48 can be produced in a simple, safe manner, using conventional, commercially available reactants. Use of alcohol-based solvents and organic silica reagents can be avoided, while still producing MCM-48 of high quality.

While the invention has been described herein in terms of various preferred embodiments, those skilled in the art will recognize that various changes and modifications can be made without departing from the spirit and scope of the invention, as defined in the following claims.

What is claimed is:

1. A method for synthesizing MCM-48, comprising:
reacting an inorganic silica reagent, an alkylammonium hydroxide reagent, and a halide-containing surfactant in an alcohol-free, aqueous medium to form a reaction mixture;
maintaining the reaction mixture under sufficient conditions to form a crystalline MCM-48 product.

2. A method according to claim 1, comprising:
reacting the inorganic silica reagent and the alkylammonium hydroxide reagent in an alcohol-free, aqueous medium to form a first reaction mixture;
combining the halide-containing surfactant and the first reaction mixture to form a second reaction mixture; and
maintaining the second reaction mixture under sufficient conditions to form a crystalline MCM-48 product.

3. A method according to claim 2, wherein the second reaction mixture is maintained under said sufficient conditions for a time period ranging from about 5 minutes to about 48 hours.

4. A method according to claim 3, wherein the second reaction mixture is maintained under said sufficient conditions for a time period ranging from about 30 minutes to about 12 hours.

5. A method according to claim 4, wherein the second reaction mixture is maintained under said sufficient conditions for a time period ranging from about 6 hours to about 10 hours.

6. A method according to claim 2, wherein the inorganic silica reagent and the surfactant are present in amounts such that the molar ratio of silicon to surfactant in the second reaction mixture ranges from about 2:1 to about 5:1.

7. A method according to claim 6, wherein the molar ratio of silicon to surfactant ranges from about 2.5:1 to about 4:1.

8. A method according to claim 7, wherein the molar ratio of silicon to surfactant is about 3:1.

9. A method according to claim 2, wherein the alkylammonium hydroxide and the surfactant are present in amounts such that the molar ratio of hydroxide to surfactant in the second reaction mixture ranges from about 1.2:1 to about 0.7:1.

10. A method according to claim 9, wherein the molar ratio of hydroxide to surfactant ranges from about 1.1:1 to about 0.8:1.

11. A method according to claim 10, wherein the molar ratio of hydroxide to surfactant ranges from about 1:1 to about 0.9:1.

12. A method according to claim 11, wherein the molar ratio of hydroxide to surfactant is about 1:1.

13. A method according to claim 2, wherein the inorganic silica reagent and the alkylammonium hydroxide reagent are reacted at a temperature ranging from about room temperature to about 200° C.

14. A method according to claim 13, wherein the inorganic silica reagent and the alkylammonium hydroxide reagent are reacted at a temperature ranging from about 50° C. to about 100° C.

15. A method according to claim 2, wherein the second reaction mixture is maintained at a temperature ranging from about 50° C. to about 200° C.

16. A method according to claim 15, wherein the second reaction temperature is maintained at a temperature ranging from about 95° C. to about 180° C.

17. A method according to claim 1, further comprising functionalizing the crystalline MCM-48 product by adding aluminum, alumina, or another aluminum-containing product.

18. A method according to claim 17, wherein the functionalizing includes:
slurrying the crystalline MCM-48 product with aluminum nitrate nonahydrate in an alcohol solvent; and
recovering an aluminum functionalized MCM-48 product.

* * * * *